United States Patent
Ogasawara et al.

(10) Patent No.: US 8,025,384 B2
(45) Date of Patent: Sep. 27, 2011

(54) REACTION LIQUID, SET OF INK AND REACTION LIQUID, INK JET RECORDING APPARATUS AND IMAGE RECORDING METHOD

(75) Inventors: Masashi Ogasawara, Machida (JP); Souichi Nagai, Kawasaki (JP); Tetsu Iwata, Yokohama (JP); Shuichiro Tanimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/337,204

(22) Filed: Dec. 17, 2008

(65) Prior Publication Data
US 2009/0185019 A1    Jul. 23, 2009

(30) Foreign Application Priority Data
Jan. 21, 2008   (JP) ................... 2008-010735

(51) Int. Cl.
*G01D 11/00* (2006.01)
(52) U.S. Cl. ............... 347/96; 347/95; 347/98; 347/100
(58) Field of Classification Search ............... 347/31.13, 347/31.27, 31.6, 95–100; 106/31.13, 31.27, 106/31.6; 523/160
See application file for complete search history.

(56) References Cited

U.S. PATENT DOCUMENTS

| | | | |
|---|---|---|---|
| 4,694,302 A | 9/1987 | Hackleman et al. | 346/1.1 |
| 5,356,464 A | 10/1994 | Hickman et al. | 106/20 R |
| 5,518,534 A | 5/1996 | Pearlstine et al. | 106/20 R |
| 6,084,619 A | 7/2000 | Takemoto et al. | 347/96 |
| 6,261,353 B1 | 7/2001 | Doi et al. | 106/31.6 |
| 2004/0119800 A1* | 6/2004 | Takada et al. | 347/96 |
| 2004/0249017 A1 | 12/2004 | Vuarnoz et al. | |
| 2005/0206702 A1 | 9/2005 | Yamashita et al. | 347/100 |
| 2006/0000386 A1* | 1/2006 | Hakamada et al. | 106/31.13 |
| 2006/0007288 A1 | 1/2006 | Takada et al. | 347/100 |
| 2006/0007289 A1* | 1/2006 | Nito et al. | 347/100 |
| 2006/0098068 A1 | 5/2006 | Hakamada et al. | 347/100 |
| 2006/0125895 A1* | 6/2006 | Nito et al. | 347/100 |

FOREIGN PATENT DOCUMENTS

| | | |
|---|---|---|
| JP | 63-22681 | 1/1988 |
| JP | 63-60783 | 3/1988 |
| JP | 63-299970 | 12/1988 |
| JP | 63-299971 | 12/1988 |
| JP | 64-9279 | 1/1989 |
| JP | 64-63185 | 3/1989 |
| JP | 4-332775 | 11/1992 |
| JP | 6-86142 | 3/1994 |
| JP | 6-157955 | 6/1994 |

(Continued)

OTHER PUBLICATIONS

Jun. 5, 2009 European Search Report in European Patent Appln. No. 08173060.8.

(Continued)

*Primary Examiner* — Matthew Luu
*Assistant Examiner* — Rut Patel
(74) *Attorney, Agent, or Firm* — Fitzpatrick, Cella, Harper & Scinto

(57) ABSTRACT

A reaction liquid destabilizing the dissolved state or dispersed state of a coloring material by being in contact with an ink containing the coloring material on a recording medium, wherein the reaction liquid contains at least calcium ions, glycerin and polyethylene glycols, and wherein the content and ratio of these components are specified.

22 Claims, 4 Drawing Sheets

FOREIGN PATENT DOCUMENTS

| | | |
|---|---|---|
| JP | 9-118850 | 5/1997 |
| JP | 9-207424 | 8/1997 |
| JP | 10-130550 | 5/1998 |
| JP | 11-349873 | 12/1999 |
| JP | 2000-19826 | 1/2000 |
| JP | 2000-94825 | 4/2000 |
| JP | 2006-045522 | 2/2006 |

OTHER PUBLICATIONS

Abstract only for RU 2309852 C2 (Nov. 10, 2007).

* cited by examiner

REACTION LIQUID, SET OF INK AND REACTION LIQUID, INK JET RECORDING APPARATUS AND IMAGE RECORDING METHOD

BACKGROUND OF THE INVENTION

1. Field of the Invention

The present invention relates to a reaction liquid, a set of an ink and the reaction liquid, and an ink jet recording apparatus and an image recording method using the reaction liquid. Particularly, the present invention relates to a reaction liquid used when performing recording on a recording medium using the reaction liquid and an ink in combination, a set of an ink and the reaction liquid, and an ink jet recording apparatus and an image recording method using the reaction liquid.

2. Description of the Related Art

As ink jet recording methods, various methods of recording images are proposed in which apart from a common ink for ink jet recording, a liquid for improving image quality is applied to a recording medium, prior to the application of the ink. For example, a method is proposed in which a liquid having a basic polymer is applied to a recording medium, and then, recording is performed with an ink containing an anionic dye (see Japanese Patent Application Laid-Open No. S63-060783). Also, a recording method is proposed in which a first liquid containing a reactive chemical species and a liquid containing a compound reactive with the reactive chemical species are mixed on a recording medium (see Japanese Patent Application Laid-Open No. S63-022681). Also, a method is proposed in which a liquid containing an organic compound having two or more cationic groups per molecule is applied to a recording medium, and then, recording is performed with an ink containing an anionic dye (see Japanese Patent Application Laid-Open No. S63-299971). Also, a method is proposed in which an acid liquid containing succinic acid and the like is applied to a recording medium, and then, recording is performed with an ink containing an anionic dye (see Japanese Patent Application Laid-Open No. S64-009279). Also, a method is proposed in which a liquid insolubilizing a dye is applied to a recording medium prior to the application of an ink (see Japanese Patent Application Laid-Open No. S64-063185).

Any of the above-described methods intend to suppress the blurring of an image and improve the water resistance of the image by precipitating a dye on a recording medium. However, in those methods, the effect of suppressing bleeding between a plurality of color inks is insufficient, and also, the precipitated dye is easily made nonuniformly distributed on the recording medium, so that the uniformity of image quality may decrease. Particularly, when plain paper or the like is used as the recording medium, this tendency may become remarkable because the precipitated dye only has low properties of covering the pulp fiber.

On the other hand, for a case where a pigment is used as the coloring material of the ink, an ink set in which an ink containing a pigment dispersion and another ink containing a polyvalent metal are used in combination for alleviating blurring in a multicolor recorded material is proposed (see Japanese Patent Application Laid-Open No. H09-118850). However, in this case, there is such a constraint for the ink containing a polyvalent metal that a polyvalent metal should be selected and used having regard to the compatibility between the polyvalent metal and the coloring material, in other words, the stability of the ink, so that sufficient image density may not be obtained, which is another problem.

Various methods that solve these problems and intend to achieve image uniformity and an improvement in image density are proposed. Specifically, recording methods in which a liquid composition containing polyvalent metal ions is previously applied to a recording medium, and then, an ink reactive with the liquid composition is applied for recording are proposed (see Japanese Patent Application Laid-Open No. S63-299970, Japanese Patent Publication No. H06-086142, Japanese Patent Application Laid-Open No. H09-207424, Japanese Patent Application Laid-Open No. H11-349873 and Japanese Patent Application Laid-Open No. 2000-094825). However, with any of these methods, high image density that satisfies demands for higher image quality in recent years may not be achieved, and image qualities obtained at the initial stage and after a lapse of time may become different.

Also, there is another problem that the recording medium to which the ink is applied causes the so-called curling, for example, curving or rolling due to water or a water-soluble organic solvent contained in the ink. As methods for suppressing this curling, several methods have conventionally been proposed. For example, an ink for ink jet recording containing a solid substance having four or more hydroxyl groups in the molecular structure and being soluble in water or an aqueous organic solvent is proposed (see Japanese Patent Application Laid-Open No. H04-332775). Also, as a curl-preventing agent, an ink containing saccharides, sugar alcohols, and a specific amide compound is proposed (see Japanese Patent Application Laid-Open No. H06-157955). Also, an ink containing specific polyalcohol and glycerin in combination is proposed (see Japanese Patent Application Laid-Open No. H10-130550). Also, an ink containing a solvent, a polymer binder, a mordant, a water-soluble curl preventing compound, a water-soluble desizing compound, a light resistant compound, an antifoaming agent and the like is proposed (see Japanese Patent Application Laid-Open No. 2000-019826).

As a result of the examination of the present inventors, it has become clear that a wet feeling of the surface of the recording medium (hereinafter referred to as "damp feeling") due to insufficient evaporation of the components of the reaction liquid on the recording medium and insufficient fixability of the reaction liquid occurs, so that the texture of the recorded material may be impaired. Also, it has become clear that a curling of the recording medium is due to the water or the water-soluble organic solvent contained in the reaction liquid. Further, it has also been found that with any of the conventional techniques as mentioned above, the occurrence of this damp feeling cannot be suppressed, and the texture of the recorded material deteriorates. Further, it has also been found that, for example, when the reaction liquid is applied to the entire surface of the recording medium by a coating roller or the like, a damp feeling occurs more remarkably also in a portion where the ink is not applied (a paper white portion).

Also, according to the examination of the present inventors, it has been found that when the content of the surfactant in the reaction liquid is increased to improve the penetrability of the reaction liquid in contact with the ink, both in a liquid state, into the recording medium, blurring of the recorded image, that is, feathering occurs easily in the recorded image.

Further, for the reaction liquid, it is also important that no precipitates are produced even when the components in the reaction liquid and the like evaporate. When the reaction liquid is applied to the recording medium by an ink jet system, it is important that the production of precipitates is suppressed also for suppressing clogging in the nozzles of the recording head. Also, when the reaction liquid is applied to the recording medium by a coating roller, it is important that the production of precipitates is suppressed also for preventing the precipitates from scratching the surface of the roller and for reducing motor load applied, for example, when the roller is operated again after recording pause.

SUMMARY OF THE INVENTION

Therefore, it is an object of the present invention to provide a reaction liquid that suppresses the occurrence of a damp feeling and curling in a recorded material and also suppresses the production of a precipitate in the reaction liquid and further can provide excellent image quality in which the occurrence of feathering is suppressed. Also, it is another object of the present invention to provide a set of an ink and the reaction liquid, and an ink jet recording apparatus and an image recording method, using the reaction liquid.

The above objects are achieved by the present invention described below. A reaction liquid according to the present invention is a reaction liquid used with an ink containing a coloring material and destabilizing one of the dissolved state and the dispersed state of the coloring material in the ink by being in contact with the ink on a recording medium, wherein the reaction liquid contains at least calcium ions, glycerin and polyethylene glycol having an average molecular weight of 200 or more and 1,000 or less, and the content of the calcium ions, A (% by mass), is 2.7% by mass or more and 4.3% by mass or less, based on the total mass of the reaction liquid, and the sum total of the content of the glycerin, B (% by mass), and the content of the polyethylene glycol, C (% by mass), based on the total mass of the reaction liquid is 6 times or more and 11 times or less the content of the calcium ions A (% by mass), and the ratio of the content of the glycerin B (% by mass) to the sum total of the content of the glycerin B (% by mass) and the content of the polyethylene glycol C (% by mass), (B/(B+C)), is 0.3 or more and 0.7 or less.

Also, a set of an ink and a reaction liquid according to another embodiment of the present invention is a set of an ink and a reaction liquid, being composed of an ink containing a coloring material, and a reaction liquid destabilizing one of the dissolved state and dispersed state of the coloring material in the ink by being in contact with the ink on a recording medium, wherein the reaction liquid is a reaction liquid having the above features.

Also, an ink jet recording apparatus according to another embodiment of the present invention is an ink jet recording apparatus including at least a recording head for ejecting an ink containing a coloring material, an ink cartridge having an ink storage portion for storing the ink, and a unit for applying to a recording medium a reaction liquid destabilizing one of the dissolved state and the dispersed state of the coloring material in the ink by being in contact with the ink on the recording medium, wherein the reaction liquid is a reaction liquid having the above features.

Also, an image recording method according to another embodiment of the present invention is an image recording method including at least the steps of applying to a recording medium a reaction liquid destabilizing one of the dissolved state and the dispersed state of a coloring material in an ink by being in contact with the ink containing the coloring material on the recording medium; so as to include at least a region on the recording medium that can be in contact with the ink; and applying the ink to the recording medium by an ink jet system, wherein the reaction liquid is a reaction liquid having the above features.

According to the present invention, a reaction liquid that suppresses the occurrence of a damp feeling and curling in a recorded material and also suppresses the production of precipitates in the reaction liquid and further can provide excellent image quality in which the occurrence of feathering is suppressed is provided. Also, according to another embodiment of the present invention, a set of an ink and the reaction liquid, and an ink jet recording apparatus and an image recording method using the reaction liquid are provided.

Further features of the present invention will become apparent from the following description of exemplary embodiments with reference to the attached drawings.

DESCRIPTION OF THE EMBODIMENTS

Figure 1:
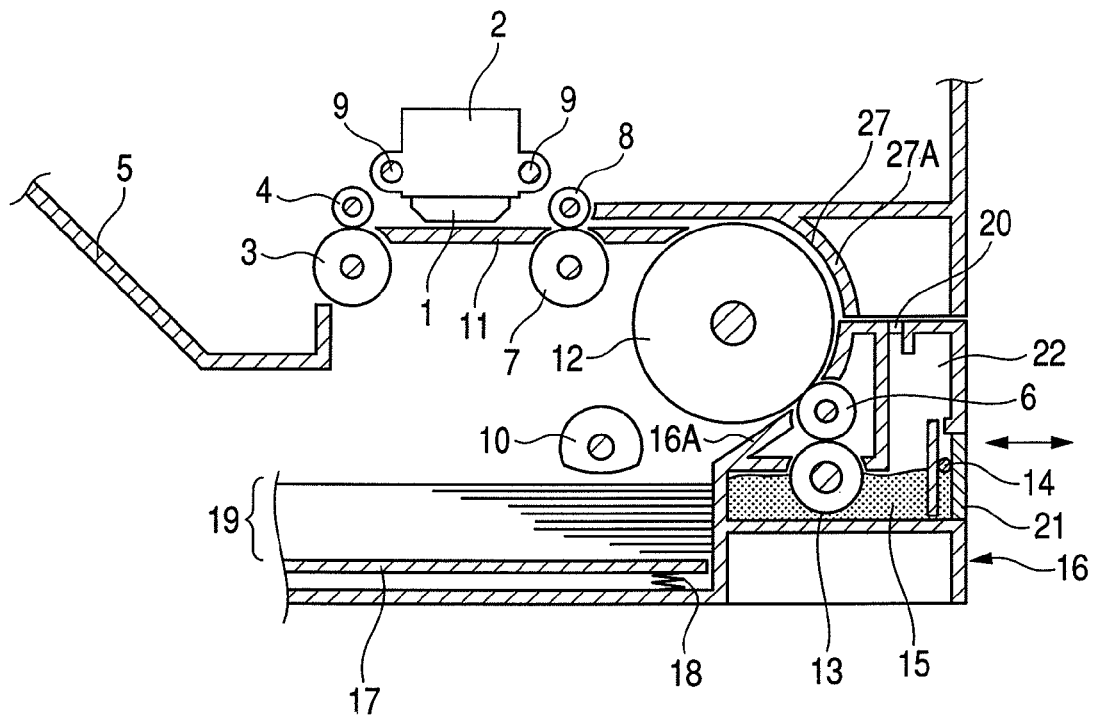
FIG. 1 is a schematic side cross-sectional view illustrating one example of an ink jet recording apparatus.

The present invention will be described below in detail by way of favorable embodiments of the present invention. In the present invention, calcium present in a reaction liquid is expressed as "calcium ions" for convenience, and "calcium ions" also includes a case where at least part of calcium ions in the reaction liquid are present in the state of salt.

<Reaction Liquid>

The reaction liquid of the present invention is a reaction liquid used together with an ink containing a coloring material and destabilizing one of the dissolved state and the dispersed state of the coloring material in the ink by being in contact with the ink and has the following features. It is essential that the reaction liquid contains at least calcium ions, glycerin, and polyethylene glycol having an average molecular weight of 200 or more and 1,000 or less, as components constituting the reaction liquid. The contents and mass ratio of the components in the reaction liquid are specified as follows. First, the content of the calcium ions, A (% by mass), is 2.7% by mass or more and 4.3% by mass or less, based on the total mass of the reaction liquid. Next, the sum total of the content of the glycerin, B (% by mass), and the content of the polyethylene glycol, C (% by mass), based on the total mass of the reaction liquid is 6 times or more and 11 times or less the content of the calcium ions A (% by mass). Lastly, the ratio of the content of the glycerin B (% by mass) to the sum total of the content of the glycerin B (% by mass) and the content of the polyethylene glycol C (% by mass), (B/(B+C)), is 0.3 or more and 0.7 or less. The dissolved state or dispersed state of the coloring material is destabilized as described above because the calcium ions in the reaction liquid and an anionic component in the ink (an anionic group and an anionic polymer dispersant chemically bonded to the surface of pigment particles) react with each other, more specifically, because the reaction between the calcium ions in the reaction liquid and the component maintaining one of the dissolved state and the dispersed state of the coloring material in the ink is brought about.

By making up the reaction liquid used together with the ink as described above, the remarkable effect of the present invention is obtained, that is, the occurrence of a damp feeling and curling in a recorded material is suppressed. Also, the production of precipitates in the reaction liquid is suppressed, and further, excellent image quality in which the occurrence of feathering is suppressed can be obtained.

As described above, the occurrence of a damp feeling in a recording medium to which the reaction liquid is applied is largely affected by the drying properties of the reaction liquid on the recording medium as well as the fixability, that is, penetrability, of the reaction liquid.

First, the drying properties of the reaction liquid are affected by environment and are particularly largely affected by humidity in environment. Therefore, in order to suppress the damp feeling, it is more effective to perform heating treatment, air blowing treatment and the like on the recording medium to which the reaction liquid is applied, than to improve the composition of the reaction liquid. However, performing treatment, such as heating and air blowing, cannot be said to be very preferable because the recording method and the configuration of recording apparatus become complicated. Therefore, it is necessary to improve the composition of the reaction liquid in order to suppress the damp feeling with simple method and apparatus.

On the other hand, the penetrability of the reaction liquid into the recording medium is strongly affected by the composition of the reaction liquid. It is particularly effective to lower the surface tension of the reaction liquid in order to improve this penetrability. For example, it is generally known that the reaction liquid contains a surfactant in order to lower the surface tension of the reaction liquid. However, as a result of the examination of the present inventors, it has been found that only making the content of the surfactant appropriate is insufficient to achieve both the suppression of the damp feeling and suppression of the feathering.

The reaction of the ink and the reaction liquid is a coagulation reaction between a component for bringing the coloring material in the ink into a dispersed state or a dissolved state, for example, an anionic component, and the calcium ions in the reaction liquid for destabilizing the dispersed state or the dissolved state of the coloring material in the ink. However, if the content of the surfactant in the reaction liquid is high, the surfactant is adsorbed on a coagulated material produced by the coagulation reaction and the coloring material in the course of the coagulation reaction when the reaction liquid and the ink are mixed on the recording medium, so that the coagulated material, the coloring material, and the like are dispersed and stabilized in the mixed liquid. As a result, with the penetration of the liquid components in the surface direction and depth (thickness) direction of the recording medium, the coagulated material produced by the coagulation reaction and the coloring material in the course of the coagulation reaction are diffused, so that feathering occurs easily.

For such a reason, it may be preferable to lower the surface tension of the reaction liquid in order to suppress the occurrence of a damp feeling, but it may be preferable to decrease the content of the surfactant as low as possible in order to suppress the occurrence of feathering.

Then, the present inventors have further examined, without complicating the treatment as described above, and also considering the merit and demerit of using the surfactant, to find the following. Knowledge has been obtained that it is very important to select a suitable water-soluble organic solvent as a water-soluble organic solvent contained in the reaction liquid in order to both suppress the damp feeling and suppress the feathering. This knowledge will be described in detail, based on the facts obtained by experiments.

First, water-soluble organic solvents general for ink jet use were used to prepare reaction liquids having compositions shown below. Specifically, components shown below were respectively mixed, sufficiently stirred, and then pressure filtered by a microfilter having a pore size of 0.2 μm (manufactured by FUJIFILM) to obtain reaction liquids.

| | |
|---|---|
| Calcium nitrate tetrahydrate | 21.8% by mass |
| Each one of the water-soluble organic solvent shown in Table 1 below | 34.6% by mass |
| Acetylenol E100 (surfactant: an acetylene glycol ethylene oxide adduct, manufactured by Kawaken Fine Chemicals) | 1.0% by mass |
| Water | 42.6% by mass |

For the reaction liquids respectively containing the water-soluble organic solvents shown in Table 1 below, prepared in this manner, the surface tension at a temperature of 25° C. was measured, using CBVP-A3 (manufactured by Kyowa Interface Science).

TABLE 1

Surface Tension of Reaction Liquids

| Water-soluble organic solvent | Surface tension of reaction liquid [mN/m] |
|---|---|
| 1,6-hexanediol | 42.3 |
| 1,5-pentanediol | 41.0 |
| Trimethylolpropane | 37.8 |
| 2-pyrrolidone | 36.9 |
| 1,2,6-hexanetriol | 35.0 |
| Diethylene glycol | 31.6 |
| Ethylene glycol | 30.4 |
| Polyethylene glycol (average molecular weight: 200) | 30.4 |
| Polyethylene glycol (average molecular weight: 400) | 29.6 |
| Polyethylene glycol (average molecular weight: 600) | 28.9 |
| Polyethylene glycol (average molecular weight: 1,000) | 28.6 |
| Glycerin | 28.6 |

From Table 1, it is found that the surface tension of the reaction liquid containing glycerin is lowest, followed by the surface tension of the reaction liquids containing polyethylene glycols. Further, it is also found that for the polyethylene glycols, as the average molecular weight of the polyethylene glycols increases, the surface tension of the reaction liquid lowers. Also, water-soluble organic solvents providing reaction liquids having higher surface tension than that for the polyethylene glycols include triols (1,2,6-hexanetriol and trimethylolpropane) other than glycerin. Water-soluble organic solvents providing higher surface tension than these materials include alkanediol of other than glycerin.

From these experiment results, when the surface tension of the reaction liquid is to be adjusted to, for example, 30 mN/m, for glycerin, the surface tension of the reaction liquid can be adjusted to the above surface tension with the lowest content of the surfactant. Also, for polyethylene glycols, the surface tension of the reaction liquid can be adjusted to the above surface tension with the surfactant in the content lowest next to that for the glycerin.

By using a reaction liquid containing glycerin that easily decreases the surface tension of the reaction liquid, calcium ions, and a surfactant whose content is appropriately set, the occurrence of a damp feeling and the occurrence of feathering in an image recorded using the reaction liquid in combination with an ink can be suppressed.

However, as a result of the examination of the present inventors, it has been found that even if such a reaction liquid is used, the problems that the occurrence of curling is suppressed and no precipitates are produced even when the components in the reaction liquid and the like evaporate cannot be solved yet.

It is considered that the production of precipitates when the components in the reaction liquid evaporate is governed by the solubility of the calcium ions in the water-soluble organic solvent in the reaction liquid. Particularly, glycerin has a high relative permittivity and is an ideal water-soluble organic solvent also in terms of the solubility of the calcium salt. However, as a result of the examination of the present inventors, it has become clear that when a reaction liquid containing glycerin and calcium ions is allowed to stand in a low-humidity environment, precipitates may be produced. Then, the present inventors examined reaction liquids containing polyethylene glycols that are water-soluble organic solvents preferable next to glycerin, glycerin and calcium ions to suppress both the occurrence of a damp feeling and the occurrence of feathering. As a result, even when the reaction liquids were allowed to stand in a low-humidity environment as in the above, no precipitates were produced.

The mechanism that the occurrence of both damp feeling and feathering is suppressed and further the production of precipitates is also suppressed by providing the reaction liquid containing calcium ions, glycerin and polyethylene glycols in this manner is not clear. However, the present inventors presume the reason as follows. Glycerin has three hydroxyl groups in the molecular structure, so that the hydrogen bond force between the molecules is very high. This is also clear from the fact that the boiling point and viscosity of glycerin are high. In the case of the reaction liquid containing calcium ions and glycerin, when the components in the reaction liquid evaporate, the glycerin has a strong property such that the glycerin molecules aggregate by means of the hydrogen bonds than the property such that the glycerin solvates the calcium ions. Therefore, the calcium ions are bonded to anions to precipitate as salt. However, it is considered that by further adding polyethylene glycols to this reaction liquid, these components act synergistically and inhibit the aggregation of the glycerin molecules, so that the glycerin comes to solvate the calcium ions, thereby suppressing the production of precipitates. However, when the reaction liquid contains no glycerin and contains calcium ions and polyethylene glycols, precipitates are produced in a low-humidity environment, regardless of the average molecular weight of the polyethylene glycols.

(Average Molecular Weight of Polyethylene Glycols)

In the reaction liquid of the present invention, it is essential that the average molecular weight of the polyethylene glycols used in combination with glycerin is 200 or more and 1,000 or less. If the average molecular weight is less than 200, the curling of a recorded material obtained by using the reaction liquid and an ink in combination may not be suppressed. Also, although also depending on the mass ratio of the glycerin to the polyethylene glycols, it may be difficult to suppress both the damp feeling and the feathering. On the other hand, if the average molecular weight is more than 1,000, the viscosity of the reaction liquid is high, so that even if the surface tension of the reaction liquid is low, the penetrability of the reaction liquid into the recording medium decreases, and as a result, the damp feeling may not be suppressed. In the present invention, it is more preferable that the average molecular weight of the polyethylene glycol is about 400 to 600, and further, it is particularly preferable that the average molecular weight is about 600. The average molecular weight of the polyethylene glycol in the present invention includes a range of ±30 of the value. For example, in the case of polyethylene glycol having an average molecular weight of 600, polyethylene glycol having a molecular weight of about 570 to 630 is regarded as having an average molecular weight of 600. In more detail, polyethylene glycol having an average molecular weight of about 570 to 630 determined by a measurement method described later is regarded as polyethylene glycol having an average molecular weight of 600.

The average molecular weight of the polyethylene glycols in the present invention is a value measured as follows. One (1) g of a polyethylene glycol sample to be measured (weighed to the digit of 0.1 mg) is put into 25 mL of a phthalic anhydride pyridine solution accurately weighed in a flask with a stopper, and the flask is stoppered, heated in a boiling water bath for 2 hours, and then allowed to stand to be at room temperature. Subsequently, 50 mL of a 0.5 mol/L sodium hydroxide aqueous solution (accurately weighed) and 10 drops of a phenolphthalein solution for titration are put into this flask. The liquid in this flask is titrated using the 0.5 mol/L sodium hydroxide aqueous solution, and a point at which the liquid keeps a red color for 15 seconds is defined as an end point. From titer in this test M (mL) obtained in this manner, and titer R (mL) obtained by a blank test performed as in the above except that no polyethylene glycol sample is used, the average molecular weight is calculated based on the following formula.

$$\text{average molecular weight} = \frac{\text{amount of polyethylene glycol sample taken [g]} \times 4000}{\left(\begin{array}{l}\text{titer in this test } M \text{ [mL]} - \\ \text{titer in blank test } R \text{ [mL]}\end{array}\right) \times 0.5 \text{ [mol/L]}}$$

(Calcium Ions and Content of Calcium Ions)

It is essential that the content of the calcium ions, A (% by mass), in the reaction liquid is 2.7% by mass or more and 4.3% by mass or less, based on the total mass of the reaction liquid. In the present invention, the content of the calcium ions is a value calculated as a calcium portion, that is, calcium atoms. If the content is less than 2.7% by mass, feathering in an image recorded using the reaction liquid and the ink in combination may not be suppressed. On the other hand, even if the content is more than 4.3% by mass, an image recorded using the reaction liquid and the ink in combination is not particularly affected, but even if the content of the calcium ions is increased to more than 4.3% by mass, no positive effect is obtained.

In the present invention, the incorporation of calcium ions in the reaction liquid can be achieved by adding a water-soluble compound in which a calcium ion is bonded to an anion, that is, water-soluble calcium salt, to the reaction liquid because when the water-soluble calcium salt is added in this manner, at least a part of the calcium salt is dissociated into calcium ions and anions and present in the reaction liquid. As described above, in the present invention, the calcium present in the reaction liquid is expressed as "calcium ions" for convenience, and "calcium ions" also include a case where part of calcium ions in the reaction liquid are bonded to anions and are present in the state of calcium salt. Specific examples of the anions that can be used in the present invention include, for example, $Cl^-$, $NO_3^-$, $I^-$, $Br^-$, $ClO^-$, $ClO^{3-}$, $ClO^{4-}$ and $CH_3COO^-$. It is particularly preferable that among these anions, $NO_3^-$ is used because the anion has excellent solubility in the aqueous medium constituting the reaction liquid.

(Sum Total of Contents of Glycerin and Polyethylene Glycols with Respect to Content of Calcium Ions)

It is essential that the sum total of the content of the glycerin, B (% by mass), and the content of the polyethylene glycols, C (% by mass), based on the total mass of the reaction liquid is 6 times or more and 11 times or less the content of the calcium ions, A (% by mass). In other words, it is necessary that the value of (B+C)/A is 6 or more and 11 or less on a mass basis. If the value of (B+C)/A is less than 6, calcium salt may precipitate from the reaction liquid. If the value of (B+C)/A is more than 11, feathering in an image recorded using the reaction liquid and the ink in combination may not be suppressed.

(Mass Ratio of Contents of Glycerin and Polyethylene Glycols)

It is essential that the ratio of the content of the glycerin, B (% by mass), based on the total mass of the reaction liquid, to the sum total of the content of the glycerin, B (% by mass), and the content of the polyethylene glycols, C (% by mass), is 0.3 or more and 0.7 or less. In other words, it is necessary that the value of B/(B+C) is 0.3 or more and 0.7 or less on a mass basis. If the value of B/(B+C) is less than 0.3, calcium salt may precipitate from the reaction liquid. If the value of B/(B+C) is more than 0.7, curling in a recorded material obtained using the reaction liquid and the ink in combination may not be suppressed.

In the present invention, it is essential that the content and mass ratio of the components in the reaction liquid are in the above-described ranges. As long as these ranges are satisfied, the content of the glycerin and the content of the polyethylene glycols are not particularly limited. The contents can be in a range as described below. The content of the glycerin in the reaction liquid (% by mass) may preferably be 4.0% by mass or more and 30.0% by mass or less, more preferably 10.0% by mass or more and 25.0% by mass or less, and particularly preferably 15.0% by mass or more and 20.0% by mass or less, based on the total mass of the reaction liquid. Also, the content of the polyethylene glycols in the reaction liquid (% by mass) may preferably be 4.0% by mass or more and 30.0% by mass or less, more preferably 10.0% by mass or more and 25.0% by mass or less, and particularly preferably 15.0% by mass or more and 20.0% by mass or less, based on the total mass of the reaction liquid.

(Surfactant)

The surfactants that can be used in the reaction liquid of the present invention are not particularly limited unless the effects of the present invention are impaired. Acetylene glycol surfactants, fluorine surfactants and silicon surfactants as well as polyoxyethylene alkyl ether and the like can be used. In the present invention, when, for example, an acetylene glycol ethylene oxide adduct (specifically Acetylenol E100, manufactured by Kawaken Fine Chemicals) is used as the surfactant, the content of the surfactant in the reaction liquid (% by mass) can be as follows. Specifically, the content of the surfactant in the reaction liquid (% by mass) can be 0.30% by mass or more and 0.80% by mass or less, based on the total mass of the reaction liquid.

(Surface Tension of Reaction Liquid)

The surface tension of the reaction liquid of the present invention can be suitably determined according to the type of the surfactant used. In the present invention, when, for example, an acetylene glycol ethylene oxide adduct (specifically Acetylenol E100, manufactured by Kawaken Fine Chemicals) is used as the surfactant, the surface tension of the reaction liquid may preferably be 27 mN/m or more and 30 mN/m or less. The surface tension of the reaction liquid is a value measured at a temperature of 25° C. by an ordinary method.

(Buffer)

The reaction liquid of the present invention may preferably contain a compound having buffer action to a change in pH, that is, a buffer, in addition to the above components. This is particularly preferable from the viewpoint that by using the reaction liquid having buffer action to a change in pH, the change in pH, which occurs easily when the components in the reaction liquid evaporate, is suppressed and the stability of the reaction liquid is maintained. The content of the buffer in the reaction liquid (% by mass) may preferably be 0.1% by mass or more and 1.0% by mass or less, based on the total mass of the reaction liquid.

For the buffer, specifically, polycarboxylates, for example, acetate, hydrogen phosphate, hydrogen carbonate and hydrogen phthalate can be used. Further, specific examples of polycarboxylic acids include malonic acid, maleic acid, succinic acid, fumaric acid, itaconic acid, phthalic acid, isophthalic acid, terephthalic acid, adipic acid, sebacic acid, dimer acid, pyromellitic acid and trimellitic acid in addition to the above-described hydrogen phthalate.

In more detail, buffers as described below can be used. As the acetate, for example, sodium acetate, potassium acetate and lithium acetate can be used. Also, as the hydrogen phosphate, for example, sodium hydrogen phosphate, potassium hydrogen phosphate and lithium hydrogen phosphate can be used. Also, as the hydrogen carbonate, for example, sodium hydrogen carbonate, potassium hydrogen carbonate and lithium hydrogen carbonate can be used. Also, as the polycarboxylate, hydrogen phthalate will be described here as an example, but, for example, sodium hydrogen phthalate, potassium hydrogen phthalate and lithium hydrogen phthalate can be used. Similarly, salts of the polycarboxylic acids listed above can be used.

Other than these buffers, any of conventionally known compounds having buffer action for a change in pH can preferably be used in the reaction liquid of the present invention as long as the change in pH in the reaction liquid can be suppressed by adding the compound. However, in the present invention, acetate, particularly lithium acetate can be used as the buffer because the acetate, particularly the lithium acetate exhibits buffer action in a pH region suitable as the pH of the reaction liquid used in combination with the ink.

(Aqueous Medium)

The reaction liquid can contain water or an aqueous medium that is a mixed solvent of water and a water-soluble organic solvent, other than the components described above. The content of the water and the water-soluble organic solvent in the reaction liquid should be in a range that the effect of adding the water and the water-soluble organic solvent is obtained and that the objects and effects of the present invention are not impaired. Specifically, the content of the water-soluble organic solvent in the reaction liquid (% by mass) may preferably be 16.2% by mass or more and 60.0% by mass or less, more preferably 20.0% by mass or more and 50.0% by mass or less, based on the total mass of the reaction liquid. The glycerin and the polyethylene glycols described above are included in this range of the content of the water-soluble organic solvent. It is particularly preferable that as the water-soluble organic solvent, a water-soluble organic solvent that can suppress the drying of the reaction liquid is used. Specifically, for example, water-soluble organic solvents as described below can be used. One of these water-soluble organic solvents may be used, or two or more of these water-soluble organic solvents may be used in combination.

Monohydric alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; polyalcohols, such as 1,5-pentanediol, 1,2-hexanediol, 1,6-hexanediol, 1,2,6-hexanetriol, trimethylolpropane and trimethylolethane; amides, such as dimethylformamide and dimethylacetamide; ketone or keto alcohols, such as acetone and diacetone alcohol; ethers, such as tetrahydrofuran and dioxane; polyalkylene glycols, such as polypropylene glycol and polyethylene glycol having an average molecular weight of more than 1,000; alkylene glycols in which the alkylene group has 2 to 6 carbon atoms, such as ethylene glycol, propylene glycol, butylene glycol, triethylene glycol, hexylene glycol and diethylene glycol; thiodiglycol; alkyl ether acetates, such as polyethylene glycol monomethyl ether acetate; alkyl ethers of polyalcohol, such as ethylene glycol monomethyl (or ethyl) ether, diethylene glycol methyl (or ethyl) ether and triethylene glycol monomethyl (or ethyl) ether; and N-methyl-2-pyrrolidone, 2-pyrrolidone and 1,3-dimethyl-2-imidazolidinone.

Also, as the water, deionized water can be used. The content of the water in the reaction liquid (% by mass) may preferably be 40.0% by mass or more and 90.0% by mass or less, based on the total mass of the reaction liquid.

(Color Tone of Reaction Liquid)

The reaction liquid of the present invention is used in combination with the ink for recording an image, so that the reaction liquid can contain no coloring material. Further, considering the effect on the image, it is particularly preferable that the reaction liquid has no absorption in the visible region, that is, the reaction liquid is colorless. Of course, the reaction liquid of the present invention is not limited to having no absorption in the visible region. The reaction liquid may have absorption in the visible region, and the reaction liquid may be of a light color if the image is not affected.

(Other Components)

Other additives, besides the above components, may be added to the reaction liquid of the present invention, in a range that the effect of adding the other additives and the like is obtained and that the objects and effects of the present invention are not impaired, to provide the reaction liquid having the values of physical properties as described above. Specific examples of such additives include antifoaming agents, preservatives and fungicides.

<Ink>

The reaction liquid of the present invention is used together with an ink containing a coloring material. Particularly, the reaction liquid of the present invention is used for recording an image in combination with an ink containing a coloring material in the state of being dispersed or dissolved in an aqueous medium by the action of ionic groups to provide the preferable effects previously described. The ink that can be preferably used in the present invention includes an ink containing a pigment as a coloring material. The reaction liquid of the present invention is used for recording an image in combination with an ink, in which a pigment is stably dispersed in an aqueous medium by ionic groups, so that the dissolved or dispersed state of the coloring material is destabilized, thereby, a coagulated material of the coloring material is formed on a recording medium, enabling the recording of a high-quality image.

(Pigment)

As the pigment, a polymer-dispersed pigment in which a pigment is dispersed using a dispersant and a self-dispersing pigment of pigment particles onto the surface of which a hydrophilic group is introduced can be used. Also, a pigment of pigment particles to the surface of which an organic group including a polymer is chemically bonded (a polymer-bonded, self-dispersing pigment), a microcapsule pigment, colored fine particles and the like can be used. In the present invention, it is particularly preferable that a pigment of pigment particles to the surface of which an anionic group is chemically bonded, and a pigment dispersed by an anionic polymer dispersant (hereinafter referred to as a dispersant) or the like are used. Of course, these pigments which differ with dispersion methods may be used in combination. The content of the pigment in the ink (% by mass) may preferably be 0.1% by mass or more and 15.0% by mass or less, and more preferably 1.0% by mass or more and 10.0% by mass or less, based on the total mass of the ink. Further, for the adjustment of the color tone of the ink, a conventionally known dye may be added as the coloring material, in addition to the pigment.

For a black ink, carbon black, such as furnace black, lamp black, acetylene black and channel black can be used as the pigment. Specifically, for example, the following commercial products can be used.

Raven 1170, 1190 ULTRA-II, 1200, 1250, 1255, 1500, 2000, 3500, 5000 ULTRA, 5250, 5750 and 7000 (manufactured by Columbian); BLACK PEARLS L, REGAL 330R, 400R and 660R, MOGUL L, MONARCH 700, 800, 880, 900, 1000, 1100, 1300, 1400 and 2000 and VULCAN XC-72R (manufactured by Cabot); COLOR BLACK FW1, FW2, FW2V, FW18, FW200, S150, S160 and S170, PRINTEX 35, U, V, 140U and 140V and SPECIAL BLACK 4, 4A, 5 and 6 (manufactured by Degussa); and No. 25, No. 33, No. 40, No. 47, No. 52, No. 900, No. 2300, MCF-88, MA7, MA8, MA100 and MA600 (manufactured by Mitsubishi Chemical).

Also, newly prepared carbon black can be used. Of course, the carbon black used for the ink is not limited to the above carbon black, and any conventional carbon black can be used. Also, there is no limitation to carbon black, and fine particles of a magnetic material, such as magnetite and ferrite, titanium black and the like may be used as the pigment of the black ink.

For a color ink, an organic pigment can be used as the pigment. Specifically, for example, the following can be used.

Water-insoluble azo pigments, such as Toluidine Red, Toluidine Maroon, Hansa Yellow, Benzidine Yellow and Pyrazolone Red; water-soluble azo pigments, such as Lithol Red, Helio Bordeaux, Pigment Scarlet and Permanent Red 2B; derivatives from vat dyes, such as Alizarine, Indanthrone and Thioindigo Maroon; phthalocyanine pigments, such as Phthalocyanine Blue and Phthalocyanine Green; quinacridone pigments, such as Quinacridone Red and Quinacridone Magenta; perylene pigments, such as Perylene Red and Perylene Scarlet; isoindolinone pigments, such as Isoindolinone Yellow and Isoindolinone Orange; imidazolone pigments, such as Benzimidazolone Yellow, Benzimidazolone Orange and Benzimidazolone Red; pyranthrone pigments, such as Pyranthrone Red and Pyranthrone Orange; indigo pigments; condensed azo pigments; thioindigo pigments; Flavanthrone Yellow, Acylamide Yellow, Quinophthalone Yellow, Nickel Azo Yellow, Copper Azomethine Yellow, Perinone Orange, Anthrone Orange, Dianthraquinonyl Red and Dioxazine Violet; and other organic pigments.

Also, when the organic pigments are shown by color index (C. I.) numbers, for example, the following can be used. C. I. Pigment Yellow 12, 13, 14, 17, 20, 24, 74, 83, 86, 93, 109, 110 and 117; C. I. Pigment Yellow 120, 125, 137, 138, 147, 148, 151, 153, 154, 166, 168, 180 and 185; C. I. Pigment Orange 16, 36, 43, 51, 55, 59, 61 and 71; C. I. Pigment Red 9, 48, 49, 52, 53, 57, 97, 122, 123, 149, 168 and 175; C. I. Pigment Red 176, 177, 180, 192, 215, 216, 217, 220, 223, 224, 226, 227, 228, 238, 240, 254, 255 and 272; C. I. Pigment Violet 19, 23, 29, 30, 37, 40 and 50; C. I. Pigment Blue 15, 15:3, 15:1, 15:4, 15:6, 22, 60 and 64; C. I. Pigment Green 7 and 36; C. I. Pigment Brown 23, 25 and 26. Of course, other than the above, conventionally known organic pigments can be used.

(Dispersant)

When the carbon black and the organic pigments mentioned above are used as the pigment, a dispersant can be used in combination. As the dispersant, a dispersant that can disperse the above pigments in the aqueous medium by the action of the anionic groups is preferable.

The dispersants specifically include, for example, the following: styrene-acrylic acid copolymers and styrene-acrylic acid-alkyl acrylate copolymers; styrene-maleic acid copolymers and styrene-maleic acid-alkyl acrylate copolymers; styrene-methacrylic acid copolymers and styrene-methacrylic acid-alkyl acrylate copolymers; styrene-maleic acid half ester copolymers, vinyl naphthalene-acrylic acid copolymers, vinyl naphthalene-maleic acid copolymers, and styrene-maleic anhydride-maleic acid half ester copolymers or salts thereof.

The polymer used as the dispersant can have a weight average molecular weight of 1,000 or more and 30,000 or less, and further 3,000 or more and 15,000 or less. In order to provide both the reliability of the ink, such as ejection stability and storage stability, and the reactivity of the ink and the reaction liquid, the polymer used as the dispersant can have an acid value of 300 mgKOH/g or less, and further 100 mgKOH/g or more and 300 mgKOH/g or less. Also, for the same reason as in the above acid value, it is more preferable that the content of the dispersant (% by mass) is 0.1 times or more and 3 times or less, and further 0.2 times or more and 2 times or less, based on the content of the coloring material in the ink (% by mass) (dispersant/coloring material).

By increasing the acid value of the dispersant or increasing the content of the dispersant in terms of the reliability of the ink, the stability of the ink with respect to the reaction liquid also increases. In this case, by increasing the content of the calcium ions in the reaction liquid, excellent image performance is obtained, but there is a tendency that the pH of the reaction liquid decreases easily. Therefore, the content of the compound having buffer action in the reaction liquid can also be increased as required.

(Self-Dispersing Pigment)

When the carbon black and the organic pigments mentioned above are used as the pigment, a pigment that can be dispersed into the aqueous medium without using the dispersant by bonding an ionic group (an anionic group) to the surface of a pigment particle, that is, a self-dispersing pigment can also be used. Such pigments include, for example, self-dispersing carbon black. The self-dispersing carbon black includes, for example, carbon black in which an anionic group is bonded to the surface of particles (hereinafter referred to as anionic carbon black). As the pigment, carbon black will be described below as an example, but the pigment is not limited to the carbon black, and a self-dispersing organic pigment can also be used.

(Anionic Carbon Black)

The anionic carbon black includes an anionic carbon black in which at least one anionic group selected from the group consisting of, for example, —COOM, —(COOM)$_2$, —SO$_3$M, —PO$_3$HM and —PO$_3$M$_2$ is bonded to the surface of carbon black particles. In the above formulas, M is each independently one of a hydrogen atom, alkali metal, ammonium and organic ammonium. Among the anionic carbon black, particularly, carbon black anionically charged, with one of —COOM, —(COOM)$_2$ and —SO$_3$M bonded to the surface of carbon black particles, is particularly preferable because of excellent dispersibility in the ink.

Specific examples of the alkali metal among those expressed as "M" in the above anionic groups include, for example, Li, Na, K, Rb and Cs. Also, specific examples of the organic ammonium include, for example, the following: methyl ammonium, dimethyl ammonium, trimethyl ammonium, ethyl ammonium, diethyl ammonium, triethyl ammonium, methanol ammonium, dimethanol ammonium and trimethanol ammonium. It is particularly preferable that an ink containing anionic carbon black in which "M" is ammonium or organic ammonium is used because the water resistance of a recorded image can be further improved. It is considered that this is because when the ink is applied on the recording medium, the ammonium or the organic ammonium decomposes, so that ammonia evaporates.

The above anionic carbon black in which "M" is ammonium or organic ammonium can be prepared by a method as described below. First, anionically charged carbon black is obtained by, for example, a method for performing oxidation treatment on carbon black with sodium hypochlorite. A —COONa group can be chemically bonded to the surface of the carbon black particles by this method. Next, for example, an anionic carbon black in which "M" is alkali metal is prepared in this manner, and "M" is then substituted by ammonium or organic ammonium by an ion exchange method. Also, the anionic carbon black in which "M" is ammonium or organic ammonium can be obtained by a method in which an anionic carbon black in which "M" is alkali metal is prepared, to which an acid is added to form an H type, to which ammonium hydroxide or the like is then added to change "M" to ammonium or organic ammonium.

Various hydrophilic groups as mentioned above may be directly bonded to the surface of the carbon black particles. Alternatively, another atomic group may present between the surface of the carbon black particles and the hydrophilic group, and the hydrophilic group may be indirectly bonded to the surface of the carbon black particle. Specific examples of another atomic group include, for example, linear or branched alkylene groups having 1 to 12 carbon atoms, substituted or unsubstituted phenylene groups and substituted or unsubstituted naphthylene groups. Here, the substituents on the phenylene group and the naphthylene group include, for example, linear or branched alkyl groups having 1 to 6 carbon atoms. Also, specific examples of a combination of another atomic group and the hydrophilic group include, for example, —C$_2$H$_4$COOM, -Ph-SO$_3$M, -Ph-COOM and -Ph-(COOM)$_2$ (Ph is a phenylene group, and M is as defined above).

(Colored Fine Particles/Microcapsule Pigment)

As the coloring material of the ink, a pigment microencapsulated with a polymer or the like, colored fine particles in which polymer particles are covered with a coloring material, and the like can also be used in addition to the coloring materials mentioned above. The microcapsule essentially has dispersibility in an aqueous medium, but the dispersants as mentioned above may be further added into the ink to further improve the dispersion stability. Also, when the colored fine particles are used as the coloring material, the dispersants as mentioned above and the like can be used.

(Aqueous Medium)

For the ink, water or an aqueous medium that is a mixed solvent of water and a water-soluble organic solvent can be used. Also, when the ink is applied to a recording medium by an ink jet method (for example, Bubble Jet (registered trademark) method), the ink may preferably be adjusted to have desired viscosity and surface tension so as to provide excellent ink jet ejection properties.

The content of the water-soluble organic solvent in the ink (% by mass) may preferably be 3.0% by mass or more and 50.0% by mass or less, based on the total mass of the ink. It is particularly preferable that as the water-soluble organic solvent, a water-soluble organic solvent that can suppress the drying of the ink is used. Specifically, for example, water-soluble organic solvents as described below may be used. These water-soluble organic solvents may be used alone or in a combination of two or more types.

Alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides, such as dimethylformamide and dimethylacetamide; ketone or keto alcohols, such as acetone and diacetone alcohol; ethers, such as tetrahydrofuran and dioxane; polyalkylene glycols, such as polyethylene glycol and polypropylene glycol; alkylene glycols in which an alkylene group has 2 to 6 carbon atoms, such as ethylene glycol, propylene glycol, butylene glycol, triethylene glycol, 1,2,6-hexanetriol, hexylene glycol and diethylene glycol; thiodiglycol; alkyl ether acetates, such as polyethylene glycol monomethyl ether acetate; glycerin; alkyl ethers of polyalcohol, such as ethylene glycol monomethyl (or ethyl) ether, diethylene glycol methyl (or ethyl) ether and triethylene glycol monomethyl (or ethyl) ether; polyalcohols, such as 1,5-pentanediol, 1,2-hexanediol, 1,6-hexanediol, trimethylolpropane and trimethylolethane; and N-methyl-2-pyrrolidone, 2-pyrrolidone and 1,3-dimethyl-2-imidazolidinone.

Also, as the water, deionized water can be used. The content of the water in the ink (% by mass) may preferably be 50.0% by mass or more and 95.0% by mass or less, based on the total mass of the ink.

(Other Components)

Of course, other than the above components, a humectant and the like may be added as required to the ink. A surfactant, an antifoaming agent, a preservative, a fungicide and the like may be added to provide an ink having the desired properties. The pH of the ink may preferably be 6 or more and 10 or less, more preferably 7 or more and 9 or less. Also, in the present invention, by more effectively reacting the ink and the reaction liquid, the uniformity of a solid image can be improved, and strike-through can be suppressed, so that it is particularly preferable that the pH of the reaction liquid is lower than the pH of the ink.

<Set of Ink and Reaction Liquid>

A set of an ink and a reaction liquid in the present invention (hereinafter sometimes referred to as a set) has the reaction liquid of the present invention and the ink described above. The color tone of the ink is not particularly limited, and the ink should have one color tone selected from the group consisting of, for example, yellow, magenta, cyan, red, green, blue and black. Specifically, a coloring material can be appropriately selected from the above-described coloring materials so as to provide an ink having the desired color tone and used. Also, the ink used in combination with the reaction liquid is not limited to one ink, and more preferably, two or more different inks are combined to provide an ink set suitable for the recording of a multicolor image. In this case, at least one ink of the two or more inks may react with the reaction liquid.

For example, when one ink in which a coloring material is dispersed in an aqueous medium by the action of ionic groups is used, other inks may be inks containing dyes as coloring materials. Of course, all inks constituting the ink set may be inks in which a coloring material is dispersed in an aqueous medium by the action of ionic groups. When the set of the present invention which satisfies the above requirements is used, the bleeding which may occur when inks having different colors are applied on the recording medium adjacent to each other, which is also a problem when a multicolor image is recorded, can be suppressed.

In the present invention, it is more preferable to provide a set as described below. When a multicolor image is recorded, bleeding between a black ink and other color inks (at least one ink selected from the group consisting of, for example, yellow, magenta, cyan, red, green and blue inks) is particularly remarkably recognized. Therefore, as the ink in which the dissolved state or dispersed state of the coloring material is destabilized by the ink being in contact with the reaction liquid of the present invention, a black ink in which a pigment is dispersed in an aqueous medium by the action of ionic groups can be used. In this case, other color inks may be inks containing dyes as coloring materials. Of course, all other inks may be inks in which a coloring material is dispersed in an aqueous medium by the action of ionic groups, as in the above black ink.

<Ink Jet Recording Method, Ink Jet Recording Apparatus and Image Recording Method>

The reaction liquid of the present invention is used together with the ink containing the coloring material, and at least the ink can be applied to a recording medium by an ink jet recording system. Also, the region on the recording medium to which the reaction liquid is applied may preferably include at least a region to which the ink is applied, and further, it is particularly preferable that the reaction liquid is applied to the entire region of the recording medium. More specifically, it is particularly preferable that the reaction liquid is applied to the recording medium so as to include at least the region on the recording medium to which the ink is applied, so that the ink and the reaction liquid are in contact with each other on the recording medium.

The amount of the reaction liquid applied to the recording medium may be suitably determined according to the content of the calcium ions in the reaction liquid and the composition of the ink reacted. Particularly, in the present invention, the amount of the reaction liquid applied to the recording medium may preferably be 0.5 g/m$^2$ or more and 3 g/m$^2$ or less because the uniformity of a solid image and the fixability can be improved. Also, it is more preferable that the lower limit of the amount of the reaction liquid applied to the recording medium is 1 g/m$^2$ or more, further 1.6 g/m$^2$ or more, and particularly 2 g/m$^2$ or more. Also, it is more preferable that the upper limit of the amount of the reaction liquid applied to the recording medium is 2.4 g/m$^2$ or less. When the region to which the reaction liquid is applied is only a certain part of the size (area: m$^2$) of the recording medium, assuming that the entire surface of the recording medium is coated, the value of the amount of the reaction liquid applied (g/m$^2$) is obtained. This value may preferably satisfy the above range.

Methods for applying the reaction liquid of the present invention to the recording medium include a method making use of the ink jet system as is the case with the ink, and a method for coating the reaction liquid by means of a coating roller or the like. In the present invention, particularly, it is particularly preferable that the application of the reaction liquid to the recording medium is performed by the coating roller because the ejection properties for the reaction liquid need not be considered, and further, the reaction liquid can be effectively applied to the recording medium. The detail of the method for applying the reaction liquid using this coating roller will be described later.

One example of the configuration of an ink jet recording apparatus and the like will be described below with reference to the drawings. FIG. 1 illustrates one example of the ink jet recording apparatus of the present invention. Here, an aspect in which the ink and the reaction liquid are respectively applied to a recording medium by the ink jet system and by a coating roller will be described as an example.

The ink jet recording apparatus in FIG. 1 employs a serial ink jet recording system and has a recording head 1, a paper feed cassette 16, a drive unit for reciprocating the recording head in the direction orthogonal to the conveyance direction of the recording medium, and a control unit for controlling the drive of these components. In the paper feed cassette 16, a paper feed tray 17 for feeding a recording medium 19, and a coating unit for coating with the reaction liquid of the present invention previously described are integrally formed. The paper feed cassette 16 has a structure in which the recording medium 19 fed from the paper feed tray 17 is uniformly coated with the reaction liquid in an adjusted coating amount. The detail of a unit for applying the reaction liquid to the recording medium (a reaction liquid coating unit) will be described later.

The recording head 1 is mounted on a carriage 2 in such a manner that a surface on which ejection ports are formed is oriented to the platen 11 side. Although not illustrated, the recording head 1 has the above ejection ports, a plurality of electrothermal converters (for example, heat generating resistive elements) for heating an ink, and a substrate for supporting the electrothermal converters. An ink cartridge is mounted inside the carriage on which the recording head 1 is mounted.

The carriage 2 has the recording head 1 mounted and can reciprocate along two guide shafts 9 extending in parallel along the width direction of the recording medium 19. Also, the recording head 1 is driven in synchronization with the reciprocation of this carriage 2 and ejects (applies) the ink to the recording medium 19 to record an image.

The paper feed cassette 16 is detachable from the ink jet recording apparatus body. The recording medium 19 is stacked and housed on the paper feed tray 17 in this paper feed cassette 16. During paper feed, the uppermost sheet is pressed against a paper feed roller 10 by a spring 18 for pressing the paper feed tray 17 upward. This paper feed roller 10 is a roller having a generally semicircular cross-section, is driven and rotated by a motor not illustrated, and feeds only the uppermost sheet (recording medium 19) by a separation claw not illustrated.

The separated and fed recording medium 19 is conveyed along the conveyance surface 16A of the paper feed cassette 16 and the conveyance surface 27A of a paper guide 27 by a large-diameter intermediate roller 12 and a small-diameter coating roller 6 pressed against the intermediate roller 12. These conveyance surfaces are formed by a surface curved in an arc concentric with the intermediate roller 12. Therefore, the conveyance direction of the fed recording medium 19 is reversed by the recording medium 19 passing these conveyance surfaces 16A and 27A. In other words, the surface of the recording medium 19 that is recorded faces downward until the recording medium 19 conveyed from the paper feed tray 17 reaches the intermediate roller 12, but the surface of the recording medium 19 that is recorded faces upward (the recording head side) at the point when the recording medium 19 is opposed to the recording head 1. Therefore, the recording surface of the recording medium always faces the outside direction of the ink jet recording apparatus.

In the apparatus in FIG. 1, the unit for applying the reaction liquid to the recording medium (the reaction liquid coating unit) is provided in the paper feed cassette 16 as previously described. The reaction liquid coating unit will be described. The reaction liquid coating unit has a replenishment tank 22 for supplying a reaction liquid 15, a supply roller 13 rotatably supported with a part of the circumferential surface dipped in the reaction liquid 15, and a coating roller 6 that is located parallel to the supply roller 13, is in contact with the supply roller 13, and rotates in the same direction. The coating roller 6 is located so that the circumferential surface is in contact with and is parallel to the intermediate roller 12 for conveying the recording medium 19. Therefore, when the recording medium 19 is conveyed, the intermediate roller 12 and the coating roller 6 rotate with the rotation of the intermediate roller 12. As a result, the reaction liquid 15 is supplied to the circumferential surface of the coating roller 6 by the supply roller 13, and further, the recording surface of the recording medium 19 held between the coating roller 6 and the intermediate roller 12 is evenly coated with the reaction liquid by the coating roller 6.

Also, in the ink jet recording apparatus in FIG. 1, a float 14 is provided in the replenishment tank 22. This float 14 is a substance having lighter specific gravity than the reaction liquid 15, and the remaining amount of the reaction liquid 15 can be visually checked externally through a remaining amount indicator window 21 that is a transparent member by the float 14 floating on the liquid surface of the reaction liquid 15.

Figure 2:
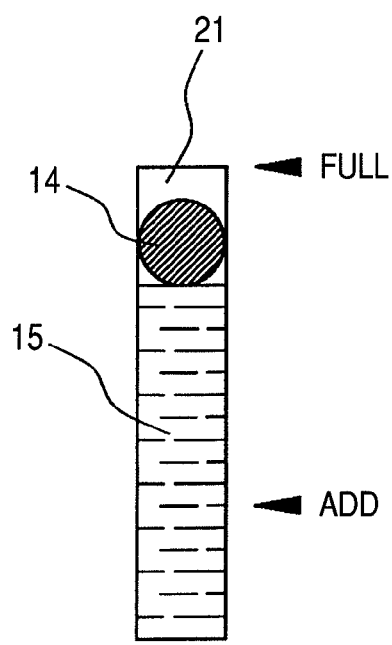
FIG. 2 is a front cross-sectional view of a remaining reaction liquid amount indicator portion provided in the ink jet recording apparatus in FIG. 1.

FIG. 2 is a view of a remaining amount indicator portion seen from the front. In the remaining amount indicator portion, marks for indicating the degree of the remaining amount are provided along the longitudinal direction of the remaining amount indicator window 21. When the liquid surface of the reaction liquid 15 or the float 14 reaches a position indicated as "Full" in the figure, a full state is indicated. On the other hand, when the liquid surface of the reaction liquid 15 or the float 14 is at a position indicated as "Add," the fact that the remaining amount of the reaction liquid 15 is small is indicated. Therefore, when this remaining amount indicator window 21 is externally observed, it is clearly seen that the replenishment of the reaction liquid should be done when the amount of the reaction liquid 15 decreases gradually and the float 14 drops to the Add line.

Figure 3:
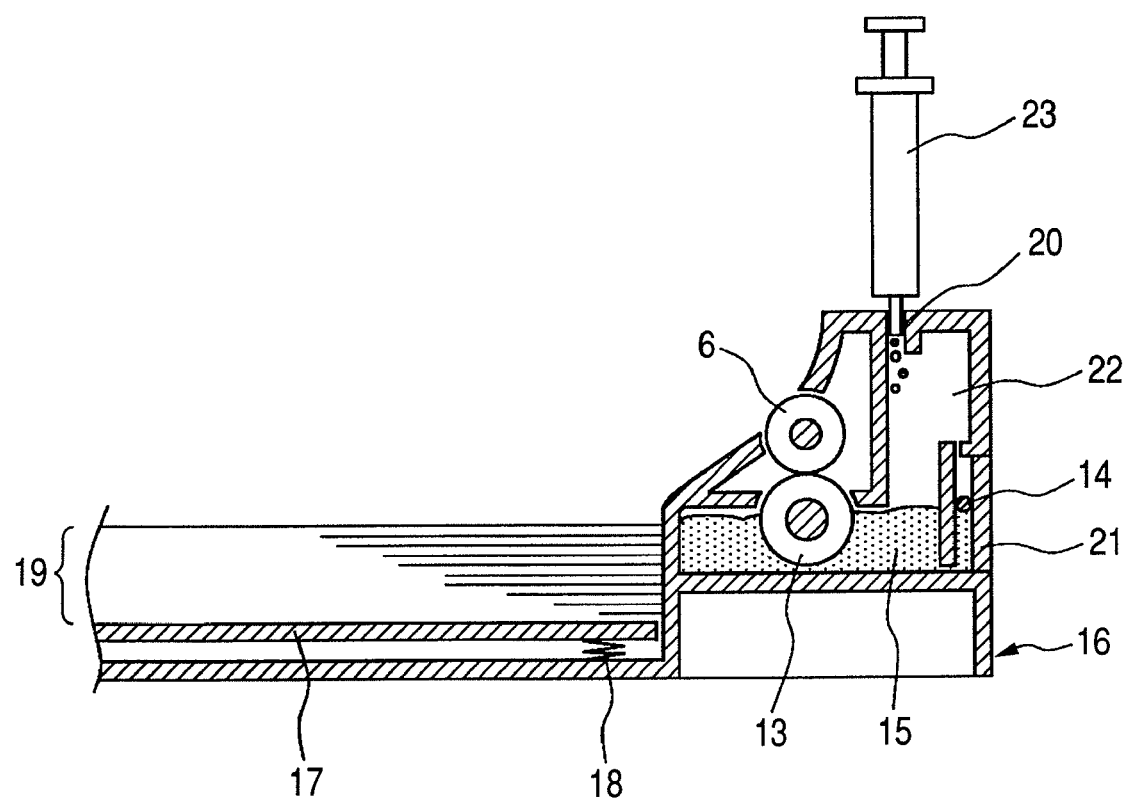
FIG. 3 is a schematic side cross-sectional view illustrating a state in which the ink jet recording apparatus in FIG. 1 is replenished with a reaction liquid.

Methods for replenishing the replenishment tank 22 with the reaction liquid 15 include a method as described below. For example, as illustrated in FIG. 3, the reaction liquid can be injected into the replenishment tank 22 by inserting the tip of an injection instrument 23 into an injection port 20 constituted by a rubber member with a cut, with the paper feed cassette 16 pulled out from the ink jet recording apparatus.

Subsequently, the recording medium 19 coated with the reaction liquid 15 by the above-described reaction liquid coating unit is sent by a main conveyance roller 7 and a pinch roller 8 pressed against the main conveyance roller 7 by a predetermined amount and is conveyed to a recording portion, and the ink is applied to the recording medium 19 from the recording head 1. The recording medium 19 fed and recorded in the above manner is discharged and conveyed by a paper discharge roller 3 and a spur 4 pressed against the paper discharge roller 3 and is stacked on a paper discharge tray 5.

Also, particularly when the reaction liquid 15 is applied by the roller or the like, the viscosity of the reaction liquid 15 can be higher than the viscosity of the ink. This manner is preferable because even if the amount of the reaction liquid 15 applied is small, the reaction liquid 15 can react efficiently with the ink, and the fixability and the like are also preferable. More specifically, when the viscosity of the reaction liquid is higher than the viscosity of the ink, the calcium ions in the reaction liquid more easily remain near the surface of the recording medium and more easily react efficiently with the ink. On the other hand, it is particularly preferable that after the ink reacts with the reaction liquid, the coloring material in the ink remains near the surface of the recording medium, and also, the aqueous medium and the like in the ink penetrate quickly in the depth (thickness) direction of the recording medium, that is, solid-liquid separation is quickly performed. Therefore, the viscosity of the ink can be relatively low in terms of the fixability of a recorded material, and the like.

Specifically, when the reaction liquid is applied to the recording medium by the coating roller or the like, the viscosity of the reaction liquid may preferably be 3 mPa·s or more and 100 mPa·s or less, and more preferably 5 mPa·s or more and 60 mPa·s or less. On the other hand, the viscosity of the ink may preferably be 1 mPa·s or more and 15 mPa·s or less. Setting the viscosity of the ink in this manner is also preferable in terms of the ink jet ejection properties, particularly the ejection stability of the ink. In the present invention, the viscosity of the reaction liquid and the ink is a value measured at a temperature of 25° C. by a normal method.

In this aspect, it is particularly preferable that the ink is applied to the recording medium by the ink jet system after the reaction liquid is applied to the recording medium in order to efficiently contact the reaction liquid and the ink to make the reaction liquid and the ink easily react with each other. In this case, the time interval from the application of the reaction liquid to the recording medium to the application of the ink may preferably be 1 to 2 seconds to 2 to 3 minutes in order to sufficiently obtain the reactivity of the reaction liquid and the ink.

Another example of the configuration of the ink jet recording apparatus and the like will be described below with reference to the drawings. Here, an aspect in which the ink and the reaction liquid are both applied to a recording medium by the ink jet system will be described as an example.

Figure 4:
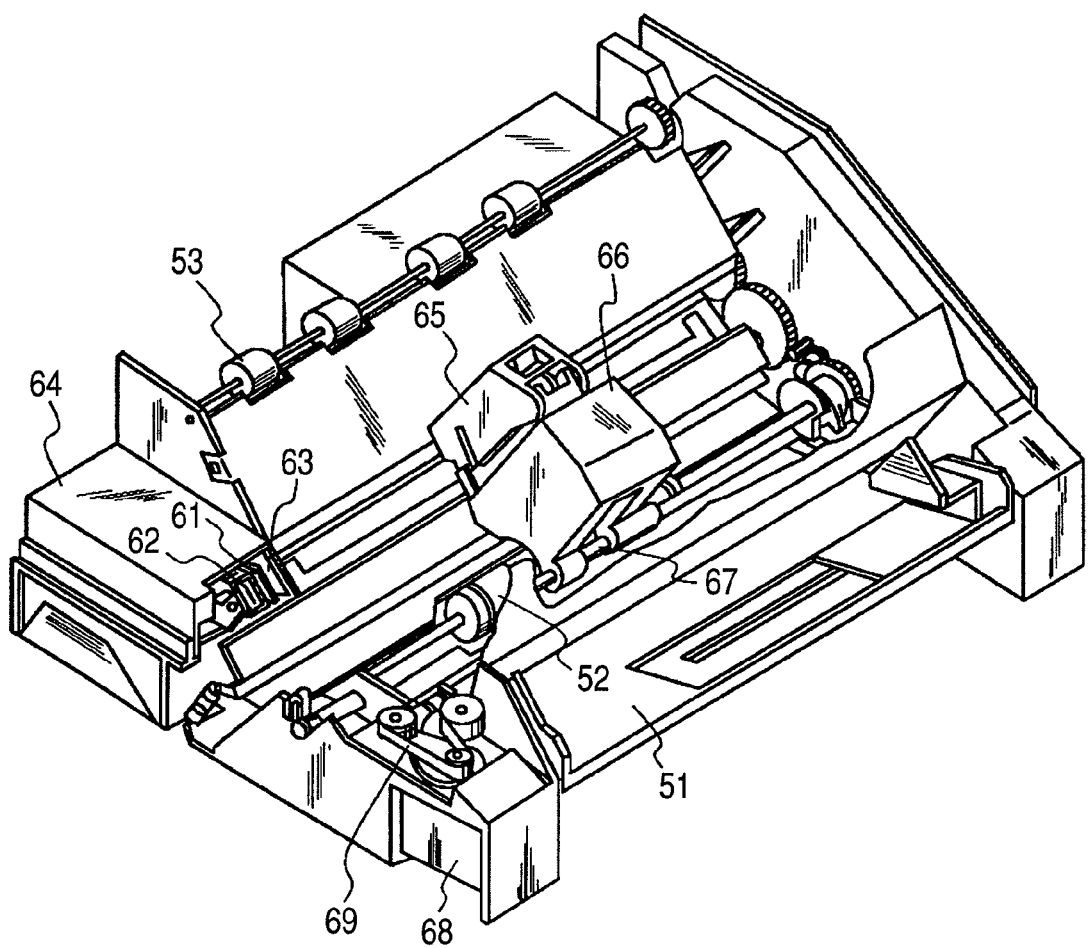
FIG. 4 is a schematic perspective view illustrating one example of an ink jet recording apparatus.

FIG. 4 illustrates another example of the ink jet recording apparatus of the present invention. In FIG. 4, a blade 61 serves as a wiping member. One end of the blade 61 is held by and fixed to a blade holding member, and the blade 61 is in the form of a cantilever. The blade 61 is located at a position adjacent to a recording region for a recording head 65, and also, in this aspect, held in the form of protruding into the movement path of the recording head 65.

A cap 62 for the ejection port surface of the recording head 65 is located at a home position adjacent to the blade 61 and is adapted to move in the direction perpendicular to the moving direction of the recording head 65, abut the ejection port surface, and perform capping. Further, an absorber 63 is provided adjacent to the blade 61 and held in the form of protruding into the movement path of the recording head 65 as in the blade 61. An ejection recovery portion 64 is constituted by the above blade 61, cap 62 and absorber 63, and the removal of moisture, dust and the like on the ejection port surface is performed by the blade 61 and the absorber 63. Also, one of the ink and the reaction liquid is sucked from the ejection ports of the recording head by a pump not illustrated via the cap to constitute a recovery unit for recovering the ejection performance of the recording head.

A recording head 65 has an ejection energy generating unit and applies one of the ink and the reaction liquid to the recording medium opposed to the ejection port surface, on which the ejection ports are arranged, to perform recording. A carriage 66 has the recording head 65 mounted and moves the recording head 65. The carriage 66 slidably engages a guide shaft 67, and a part of the carriage 66 is connected to a belt 69 driven by a motor 68 (not illustrated). Therefore, the carriage 66 can move along the guide shaft 67 and can move in the recording region for the recording head 65 and a region adjacent to the recording region. In a paper feed portion 51, the recording medium is inserted. A paper sending roller 52 is driven by a motor not illustrated.

By the configuration, the recording medium is fed to a position opposed to the ejection port surface of the recording head 65, and as the recording proceeds, the recording medium is discharged to a paper discharge portion in which paper discharge rollers 53 are arranged. In the above configuration, when the recording head 65 finishes recording and returns to the home position, the cap 62 of the ejection recovery portion 64 is retracted from the movement path of the recording head 65, but the blade 61 protrudes into the movement path. As a result, the ejection ports of the recording head 65 are wiped. When capping is performed with the cap 62 abutting the ejection surface of the recording head 65, the cap 62 moves so as to protrude into the movement path of the recording head. When the recording head 65 moves from the home position to a recording start position, the cap 62 and the blade 61 are at the same positions as the positions during wiping described above. As a result, also in this movement, the ejection port surface of the recording head 65 is wiped.

The above-described movement of the recording head to the home position is performed not only at the end of recording and during ejection recovery. While the recording head moves in the recording region for recording, the recording head moves to the home position adjacent to the recording region at predetermined intervals, and with this movement, the above wiping is performed.

In this aspect, the ink and the reaction liquid are both applied to the recording medium by the ink jet system. The order of applying the ink and the reaction liquid to the recording medium includes the following methods (a) to (d) and combinations of these methods and can be appropriately selected. The time interval between the application of the reaction liquid to the recording medium and the application of the ink to the recording medium can be 1 to 2 seconds to 2 to 3 minutes in order to sufficiently obtain the reactivity of the reaction liquid and the ink.

(a): After the reaction liquid is applied, the ink is applied.
(b): After the ink is applied, the reaction liquid is applied.
(c): After the ink is applied, the reaction liquid is applied, and further, the ink is applied.
(d): After the reaction liquid is applied, the ink is applied, and further, the reaction liquid is applied.

Also in this aspect, it is particularly preferable to use the methods (a) and (d) including the step of applying the ink after applying the reaction liquid to the recording medium in order to efficiently contact the reaction liquid and the ink to make the reaction liquid and the ink easily react with each other.

Figure 5:
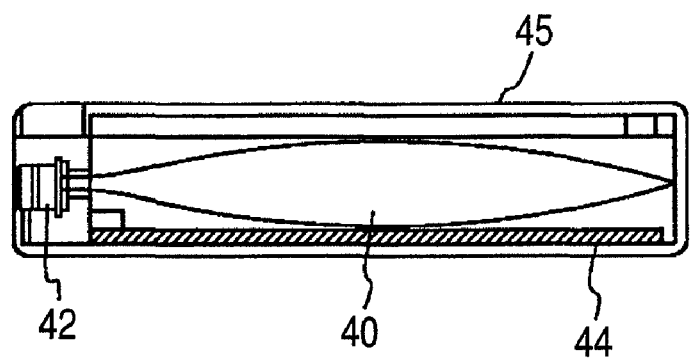
FIG. 5 is a longitudinal cross-sectional view illustrating one example of an ink cartridge.
Figure 6:
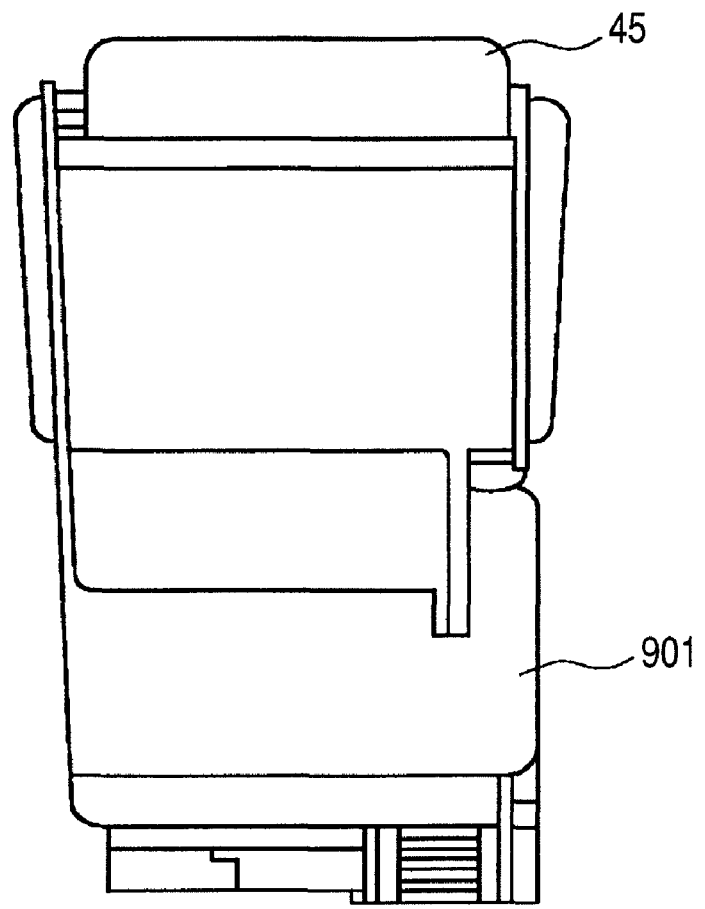
FIG. 6 is a schematic plan view illustrating a state in which the ink cartridge is mounted in a recording head.

A cartridge that can be applied to the above aspects will be described below. FIG. 5 is a figure illustrating one example of a cartridge 45 having a supply member for supplying one of the ink and the reaction liquid to the recording head, and a storage portion for storing one of the ink and the reaction liquid supplied to the recording head via, for example, a tube and a needle. Here, a storage portion 40 for storing one of the ink and the reaction liquid for supply is, for example, a bag, and a rubber stopper 42 is provided at the tip. When the cartridge stores the ink, the above storage portion is an ink storage portion. By inserting a needle (not illustrated) into the stopper 42, one of the ink and the reaction liquid in the bag 40 can be supplied to the recording head. An absorber 44 absorbs a waste ink and a waste reaction liquid. As the storage portion 40, one having a surface for contact with one of the ink and the reaction liquid, formed of polyolefin, particularly polyethylene, is preferable. The cartridge is, for example, adapted to be detachable from a recording head 901 for ejecting one of the ink and the reaction liquid, as illustrated in FIG. 6, and is adapted to supply one of the ink and the reaction liquid to the recording head 901, with the cartridge 45 mounted in the recording head.

EXAMPLES

The present invention will be further specifically described below using examples and comparative examples, but the present invention is not limited to these examples unless beyond the gist of the present invention. In the following description, "%" and "part" are based on mass unless otherwise specified. The measurement of the surface tension of the reaction liquid was performed under a condition of a temperature of 25° C., using CBVP-A3 (manufactured by Kyowa Interface Science). Also, the measurement of the viscosity of the reaction liquid was performed under a condition of a temperature of 25° C., using RE-80L (TOKI SANGYO). Also, the average molecular weight of polyethylene glycols used is a value obtained by measuring by the above-described method.

<Preparation of Reaction Liquids>

Components shown in Table 2 to Table 4 below were respectively mixed, sufficiently stirred, and then pressure filtered by a microfilter having a pore size of 0.2 μm (manufactured by FUJIFILM) to obtain reaction liquids. The properties of the components in the reaction liquids and the like, and the values of the surface tension and viscosity of the reaction liquids are shown together in Table 2 to Table 4.

TABLE 2

Composition of Reaction Liquids
(Unit of components shown in upper rows: % by mass)

| | Reaction liquid | | | | | | | |
|---|---|---|---|---|---|---|---|---|
| | 1 | 2 | 3 | 4 | 5 | 6 | 7 | 8 |
| Calcium nitrate tetrahydrate | 21.8 | 25.4 | 21.8 | 21.8 | 16.7 | 16.0 | 21.8 | 21.8 |
| Glycerin | 17.3 | 13.0 | 20.76 | 10.5 | 13.2 | 15.0 | 24.22 | 17.3 |
| Polyethylene glycol (average molecular weight: 200) | | | | 24.1 | | | | |
| Polyethylene glycol (average molecular weight: 400) | | | | | | | | |
| Polyethylene glycol (average molecular weight: 600) | 17.3 | 13.0 | 13.84 | | | 7.5 | 10.38 | 17.3 |
| Polyethylene glycol (average molecular weight: 1,000) | | | | | 13.2 | 7.3 | | |
| Polyethylene glycol (average molecular weight: 2,000) | | | | | | | | |
| Trimethylolpropane | | | | | | | | |
| Triethylene glycol | | | | | | | | |
| Acetylenol E100 (*1) | 0.60 | 0.60 | 0.60 | 0.80 | 0.60 | 0.60 | 0.55 | 0.60 |
| Acetylenol E60 (*1) | | | | | | | | |
| Lithium acetate | 0.25 | 0.25 | 0.25 | 0.25 | 0.25 | 0.25 | 0.25 | |
| Water | 42.75 | 47.75 | 42.75 | 42.55 | 56.05 | 53.35 | 42.80 | 43.00 |
| Content of calcium ions, A [% by mass] | 3.7 | 4.3 | 3.7 | 3.7 | 2.8 | 2.7 | 3.7 | 3.7 |
| Content of glycerin, B [% by mass] | 17.3 | 13.0 | 20.8 | 10.5 | 13.2 | 15.0 | 24.2 | 17.3 |
| Content of polyethylene glycols, C [% by mass] (*2) | 17.3 | 13.0 | 13.8 | 24.1 | 13.2 | 14.8 | 10.4 | 17.3 |
| Value of (B + C)/A | 9 | 6 | 9 | 9 | 9 | 11 | 9 | 9 |
| Value of B/(B + C) | 0.5 | 0.5 | 0.6 | 0.3 | 0.5 | 0.5 | 0.7 | 0.5 |
| Surface tension of reaction liquid [mN/m] | 29.2 | 27.9 | 28.8 | 29.2 | 28.5 | 28.4 | 28.2 | 29.2 |
| Viscosity of reaction liquid [mPa · s] | 8.8 | 5.8 | 7.8 | 6.5 | 4.8 | 5.3 | 7.2 | 8.3 |

(*1) Acetylene glycol ethylene oxide adduct (surfactant manufactured by Kawaken Fine Chemicals)
(*2) Content of polyethylene glycol having an average molecular weight of 200 or more and 1,000 or less, C [% by mass]

TABLE 3

Composition of Reaction Liquids
(Unit of components shown in upper rows: % by mass)

| | Reaction liquid | | | | | | | | |
|---|---|---|---|---|---|---|---|---|---|
| | 9 | 10 | 11 | 12 | 13 | 14 | 15 | 16 | 17 |
| Calcium nitrate tetrahydrate | 21.8 | 21.8 | 21.8 | 21.8 | 21.8 | 21.8 | 21.8 | 25.4 | 5.0 |
| Glycerin | 34.6 | | 34.6 | | | | 17.3 | 9.5 | 16.7 |
| Polyethylene glycol (average molecular weight: 200) | | | | 17.3 | 17.3 | 17.3 | | | |

TABLE 3-continued

Composition of Reaction Liquids
(Unit of components shown in upper rows: % by mass)

| | Reaction liquid | | | | | | | | |
|---|---|---|---|---|---|---|---|---|---|
| | 9 | 10 | 11 | 12 | 13 | 14 | 15 | 16 | 17 |
| Polyethylene glycol (average molecular weight: 400) | | 34.6 | | | | | | | |
| Polyethylene glycol (average molecular weight: 600) | | | | | | | | 9.5 | 16.7 |
| Polyethylene glycol (average molecular weight: 1,000) | | | | | | | | | |
| Polyethylene glycol (average molecular weight: 2,000) | | | | | | | | | |
| Trimethylolpropane | | | | 17.3 | 17.3 | 17.3 | | | |
| Triethylene glycol | | | | | | | 17.3 | | |
| Acetylenol E100 (*1) | 0.40 | 1.00 | 1.00 | | 2.00 | 1.00 | 1.00 | 0.60 | 0.60 |
| Acetylenol E60 (*1) | | | | 2.00 | | | | | |
| Lithium acetate | 0.20 | 0.20 | 0.20 | 0.2 | 0.2 | 0.2 | 0.2 | 0.25 | 0.25 |
| Water | 43.00 | 42.40 | 42.40 | 41.40 | 41.40 | 42.40 | 42.40 | 54.75 | 60.75 |
| Content of calcium ions, A [% by mass] | 3.7 | 3.7 | 3.7 | 3.7 | 3.7 | 3.7 | 3.7 | 4.3 | 0.8 |
| Content of glycerin, B [% by mass] | 34.6 | 0.0 | 34.6 | 0.0 | 0.0 | 0.0 | 17.3 | 9.5 | 16.7 |
| Content of polyethylene glycols, C [% by mass] (*2) | 0.0 | 34.6 | 0.0 | 17.3 | 17.3 | 17.3 | 0.0 | 9.5 | 16.7 |
| Value of (B + C)/A | 9 | 9 | 9 | 5 | 5 | 5 | 5 | 4 | 39 |
| Value of B/(B + C) | 1.0 | 0.0 | 1.0 | 0.0 | 0.0 | 0.0 | 1.0 | 0.5 | 0.5 |
| Surface tension of reaction liquid [mN/m] | 28.9 | 29.6 | 28.7 | 28.9 | 31.8 | 34.5 | 28.9 | 28.0 | 28.9 |
| Viscosity of reaction liquid [mPa·s] | 5.3 | 10.3 | 5.3 | 8.4 | 7.6 | 7.7 | 5.3 | 3.6 | 4.3 |

(*1) Acetylene glycol ethylene oxide adduct (surfactant manufactured by Kawaken Fine Chemicals)
(*2) Content of polyethylene glycol having an average molecular weight of 200 or more and 1,000 or less, C [% by mass]

TABLE 4

Composition of Reaction Liquids
(Unit of components shown in upper rows: % by mass)

| | Reaction liquid | | | | | | | |
|---|---|---|---|---|---|---|---|---|
| | 18 | 19 | 20 | 21 | 22 | 23 | 24 | 25 |
| Calcium nitrate tetrahydrate | 15 | 21.8 | 15.3 | 30.0 | 21.8 | 16.4 | 21.8 | 21.8 |
| Glycerin | 16.7 | 17.3 | 16 | 11.2 | 18.3 | 16.8 | 28.4 | 5.2 |
| Polyethylene glycol (average molecular weight: 200) | | | | | | | | |
| Polyethylene glycol (average molecular weight: 400) | | | | | | | | 29.4 |
| Polyethylene glycol (average molecular weight: 600) | 16.7 | | 13.4 | 11.2 | | 16.8 | 6.2 | |
| Polyethylene glycol (average molecular weight: 1,000) | | | 2.6 | | | | | |
| Polyethylene glycol (average molecular weight: 2,000) | | 17.3 | | | | | | |
| Trimethylolpropane | | | | | | | | |
| Triethylene glycol | | | | | | | | |
| Acetylenol E100 (*1) | 0.60 | 0.60 | 0.60 | 0.60 | 0.60 | 0.60 | 0.49 | 0.91 |
| Acetylenol E60 (*1) | | | | | | | | |
| Lithium acetate | 0.25 | 0.25 | 0.25 | 0.25 | 0.25 | 0.25 | 0.25 | 0.25 |
| Water | 50.75 | 42.75 | 51.85 | 46.75 | 59.05 | 49.15 | 42.86 | 42.44 |
| Content of calcium ions, A [% by mass] | 2.5 | 3.7 | 2.6 | 5.1 | 3.7 | 2.8 | 3.7 | 3.7 |
| Content of glycerin, B [% by mass] | 16.7 | 17.3 | 16.0 | 11.2 | 18.3 | 16.8 | 28.4 | 5.2 |
| Content of polyethylene glycols, C [% by mass] (*2) | 16.7 | 0.0 | 16.0 | 11.2 | 0.0 | 16.8 | 6.2 | 29.4 |

TABLE 4-continued

Composition of Reaction Liquids
(Unit of components shown in upper rows: % by mass)

| | Reaction liquid | | | | | | | |
|---|---|---|---|---|---|---|---|---|
| | 18 | 19 | 20 | 21 | 22 | 23 | 24 | 25 |
| Value of (B + C)/A | 13 | 5 | 12 | 4 | 5 | 12 | 9 | 9 |
| Value of B/(B + C) | 0.5 | 1.0 | 0.5 | 0.5 | 1.0 | 0.5 | 0.8 | 0.2 |
| Surface tension of reaction liquid [mN/m] | 28.3 | 28.9 | 28.3 | 29.1 | 29.1 | 28.5 | 28.5 | 29.5 |
| Viscosity of reaction liquid [mPa·s] | 6.0 | 15.8 | 5.8 | 5.3 | 8.1 | 6.6 | 6.4 | 9.6 |

(*1) Acetylene glycol ethylene oxide adduct (surfactant manufactured by Kawaken Fine Chemicals)
(*2) Content of polyethylene glycol having an average molecular weight of 200 or more and 1,000 or less, C [% by mass]

<Preparation of Inks>

As an ink used with the reaction liquid, a black ink was prepared according to the following procedure.

10 parts of carbon black (trade name: Nipex 170, manufactured by Degussa), 40 parts of a dispersant (polymer solids: 8 parts), and 50 parts of pure water were mixed. As the dispersant, an aqueous liquid in which an anionic polymer (a benzyl methacrylate-methacrylic acid copolymer) having an acid value of 150 mgKOH/g and a weight average molecular weight of 8,000 was neutralized with potassium hydroxide, with the content of the polymer solids being 20%, was used. This mixture was put into a batch-type vertical sand mill (manufactured by IMEX), and the sand mill was filled with 150 parts of zirconia beads having a diameter of 0.3 mm to perform dispersion treatment for 5 hours while water-cooling. The obtained dispersion was centrifuged to remove coarse particles to obtain a pigment dispersion. The content of the solids in the obtained pigment dispersion was about 18% (the content of the pigment: about 10%, and the content of the polymer: about 8%), and the weight average particle diameter of the pigment was 95 nm.

Using the pigment dispersion obtained above, the following components were mixed to prepare a black ink containing carbon black as a coloring material. The content of the pigment in the obtained black ink was about 3%, the content of the polymer was about 2.4%, and the viscosity of the ink was 2.4 mPa·s.

(Ink Composition)

| | |
|---|---|
| Pigment dispersion | 30.0% |
| Glycerin | 10.0% |
| 2-Pyrrolidone | 2.5% |
| Polyethylene glycol (Average molecular weight: 1,000) | 2.0% |
| Acetylenol E100 (Surfactant: acetylene glycol ethylene oxide adduct, manufactured by Kawaken Fine Chemicals) | 0.3% |
| Water | 55.2% |

<Evaluation>
(Damp Feeling)

A recording medium (trade name: Office Planner, manufactured by Canon) was coated with each reaction liquid by a coating roller. The amount of the reaction liquid applied, at this time, was 2 g/m². After 1 minute from the coating, the recording medium coated with the reaction liquid was touched by fingers to evaluate the state of a damp feeling. The evaluation standard for a damp feeling is as follows. The results are shown in Table 5.

AA: the recording medium has no wet feeling, and no damp feeling is felt.

A: the recording medium has little wet feeling, and little damp feeling is felt.

B: the recording medium has some wet feeling, and some damp feeling is felt.

C: the recording medium has a considerable wet feeling, and a considerable damp feeling is felt.

(Feathering)

The black ink obtained above and the reaction liquids were respectively combined to provide sets, and using these sets, images were recorded. An ink cartridge filled with the black ink was mounted at a position for a black ink in an ink jet recording apparatus (trade name: BJS700, manufactured by Canon).

First, a recording medium (trade name: SW-101, manufactured by Canon) was coated with each reaction liquid by a coating roller. The amount of the reaction liquid applied, at this time, was 2 g/m². Immediately afterward, letters of 36 points and ruled lines were recorded on the recording medium coated with the reaction liquid, by the ink jet recording apparatus. Subsequently, using Personal IAS (manufactured by Quality Engineering Associates), the raggedness value of the edges of the letters and ruled lines was measured. The evaluation standard for feathering is as follows. The results are shown in Table 5. The raggedness value represents an edge roughness of an image like letters and ruled lines by a standard deviation, and a smaller raggedness value means that the edge roughness is suppressed.

A: The raggedness value is less than 13.
B: The raggedness value is 13 or more and less than 15.
C: The raggedness value is 15 or more.

(Curling)

The following color inks and the reaction liquids were respectively combined to provide sets, and using these sets, images were recorded. An cyan ink extracted from PGI-2 Cyan (manufactured by Canon) and a magenta ink extracted from PGI-2 Magenta (manufactured by Canon) are mounted at positions for cyan and magenta inks in an ink jet recording apparatus BJS700 (manufactured by Canon).

First, a recording medium (trade name: Office Planner, manufactured by Canon) was coated with each reaction liquid by a coating roller. The amount of the reaction liquid applied, at this time, was 2 g/m². Immediately afterward, with the magenta ink and the cyan ink, a secondary color solid image was recorded on the recording medium coated with the reaction liquid. The obtained recorded material was allowed to stand in an environment of a temperature of 24° C. and a humidity of 50% RH for 3 days, and then, the degree of the curling of the recording medium was placed so as to be concave shape and evaluated by measuring the distance from a tip of the recording medium to the surface in contact with the ground of the recording medium by a ruler. The evaluation standard for curling is as follows. The results are shown in Table 5.

AA: the distance from a tip of the recording medium to the surface in contact with the ground is 33 mm or less.
A: the distance from a tip of the recording medium to the surface in contact with the ground is more than 33 mm and 43 mm or less.
B: the distance from a tip of the recording medium to the surface in contact with the ground is more than 43 mm and 50 mm or less.
C: the distance from a tip of the recording medium to the surface in contact with the ground is more than 50 mm, or the tip of the recording medium is rolled inward.

(Precipitation)

10.0 g of each reaction liquid was put into two petri dishes having a diameter of 6 cm, and these petri dishes were respectively allowed to stand in the following two environments.

Environment-1

The petri dish was allowed to stand for 14 hours in each of an environment of a temperature of 15° C. and a humidity of 10% RH, and an environment of a temperature of 30° C. and a humidity of 10% RH, and this cycle was repeated 3 times. Subsequently, the petri dish was allowed to stand for 2 weeks in a room where the conditions changed from an environment of a temperature of 23° C. and a humidity of 35% RH to an environment of a temperature of 23° C. and a humidity of 6% RH in a day. Subsequently, the state of the reaction liquid was visually checked.

Environment-2

The petri dish was allowed to stand for 24 hours in an environment of a temperature of 60° C. and a humidity of 20% RH. Subsequently, the state of the reaction liquid was visually checked. The evaluation standard for precipitation is as follows. The results are shown in Table 5.

A: No precipitate is produced in either of the and the environment-2.
C: A precipitate is produced in at least one of the and the environment-2.

When the reaction liquids of Examples 1 and 8 were respectively put into shot bottles, and the shot bottles were tightly stoppered and were allowed to stand in an environment of a temperature of 60° C. for 2 weeks, the pH of the reaction liquid of Example 8 increased, so that the stability of the reaction liquid 8 was relatively poorer than that of the reaction liquid of Example 1.

(Amount of Reaction Liquid Applied)

A recording medium (trade name: Office Planner, manufactured by Canon) was coated with the reaction liquid 1 obtained above by a coating roller. At this time, the amounts of the reaction liquid applied were values shown in Table 6 below. After 1 minute from the coating of the reaction liquid, the state of a damp feeling was evaluated by the same method and evaluation standard as the above. The results are shown in Table 6.

TABLE 6

| | | Evaluation Results | |
|---|---|---|---|
| | | Amount of reaction liquid applied [g/m$^2$] | Evaluation result of damp feeling |
| Example | 9 | 0.1 | AA |
| | 10 | 0.5 | AA |
| | 11 | 2 | A |
| | 12 | 2.5 | A |
| | 13 | 3 | A |
| | 14 | 5 | B |

The evaluation results of a damp feeling in Examples 9 and 10 were both AA. However, when solid images were recorded on the recording medium to which the reaction liquid was applied, using the black ink obtained above, and were visually checked, the uniformity of the solid image in Example 9 was somewhat poorer.

TABLE 5

| | | Evaluation Results | | | | | |
|---|---|---|---|---|---|---|---|
| | | Reaction liquid No. | Damp feeling | Feathering (letters) | Feathering (ruled lines) | Curling | Precipitation |
| Example | 1 | 1 | A | A | A | AA | A |
| | 2 | 2 | AA | A | A | AA | A |
| | 3 | 3 | A | A | A | AA | A |
| | 4 | 4 | AA | A | B | AA | A |
| | 5 | 5 | AA | B | A | AA | A |
| | 6 | 6 | AA | B | A | AA | A |
| | 7 | 7 | AA | A | A | A | A |
| | 8 | 8 | A | A | A | AA | A |
| Comparative Example | 1 | 9 | AA | A | A | C | C |
| | 2 | 10 | B | A | C | AA | C |
| | 3 | 11 | AA | C | C | C | C |
| | 4 | 12 | A | B | C | AA | C |
| | 5 | 13 | C | A | B | AA | C |
| | 6 | 14 | C | A | B | AA | C |
| | 7 | 15 | AA | C | C | C | A |
| | 8 | 16 | AA | A | A | AA | C |
| | 9 | 17 | AA | C | C | AA | A |
| | 10 | 18 | AA | C | C | AA | A |
| | 11 | 19 | C | A | A | AA | A |
| | 12 | 20 | AA | C | B | AA | A |
| | 13 | 21 | AA | A | A | AA | C |
| | 14 | 22 | B | A | C | AA | C |
| | 15 | 23 | AA | C | C | AA | A |
| | 16 | 24 | AA | A | A | C | A |
| | 17 | 25 | B | A | C | AA | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-010735, filed Jan. 21, 2008, which is hereby incorporated by reference herein in its entirety.

What is claimed is:

1. A reaction liquid, used with an ink comprising carbon black as a coloring material and acetylene glycol ethylene oxide adduct as a surfactant, and destabilizing one of a dissolved state and dispersed state of the coloring material in the ink by being in contact with the ink on a recording medium, wherein the reaction liquid comprises:
calcium ions;
glycerin;
polyethylene glycol having an average molecular weight of 200 or more and 1,000 or less; and
acetylene glycol ethylene oxide adduct as a surfactant,
wherein the content of the calcium ions, A (% by mass), is 2.7% by mass or more and 4.3% by mass or less, based on the total mass of the reaction liquid,
wherein the sum total of the content of the glycerin, B (% by mass), and the content of the polyethylene glycol, C (% by mass), based on the total mass of the reaction liquid is 6 times or more and 11 times or less the content of the calcium ions A (% by mass),
wherein the ratio of the content of the glycerin B (% by mass) to the sum total of the content of the glycerin B (% by mass) and the content of the polyethylene glycol C (% by mass), (B/(B+C)), is 0.3 or more and 0.7 or less,
wherein the content of the surfactant in the reaction liquid is more than that in the ink, and
wherein the content of the surfactant in the reaction liquid (% by mass) is 0.30% by mass or more and 0.80% by mass or less, based on the total mass of the reaction liquid.

2. The reaction liquid according to claim 1, wherein the reaction liquid further comprises a buffer.

3. The reaction liquid according to claim 1, wherein the content of the glycerin B (% by mass) is 4.0% by mass or more and 30.0% by mass or less, based on the total mass of the reaction liquid.

4. The reaction liquid according to claim 1, wherein the content of the polyethylene glycol C (% by mass) is 4.0% by mass or more and 30.0% by mass or less, based on the total mass of the reaction liquid.

5. The reaction liquid according to claim 1, wherein the surface tension of the reaction liquid at a temperature of 25° C. is 27 mN/m or more and 30 mN/m or less.

6. The reaction liquid according to claim 1, wherein the reaction liquid has a viscosity higher than that of the ink.

7. The reaction liquid according to claim 1, wherein the content of the glycerin, B (% by mass), is 4.0% by mass or more and 30.0% by mass or less, based on the total mass of the reaction liquid, and
wherein the content of the polyethylene glycol, C (% by mass), is 4.0% by mass or more and 30.0% by mass or less, based on the total mass of the reaction liquid.

8. The reaction liquid according to claim 1, wherein the content of the glycerin, B (% by mass), is 10.0% by mass or more and 25.0% by mass or less, based on the total mass of the reaction liquid, and
wherein the content of the polyethylene glycol, C (% by mass), is 10.0% by mass or more and 25.0% by mass or less, based on the total mass of the reaction liquid.

9. The reaction liquid according to claim 1, wherein the content of the glycerin, B (% by mass), is 15.0% by mass or more and 20.0% by mass or less, based on the total mass of the reaction liquid, and
wherein the content of the polyethylene glycol, C (% by mass), is 15.0% by mass or more and 20.0% by mass or less, based on the total mass of the reaction liquid.

10. The reaction liquid according to claim 9, wherein polyethylene glycol in the reaction liquid has an average molecular weight of 400 or more to 600 or less.

11. The reaction liquid according to claim 9, wherein polyethylene glycol in the reaction liquid has an average molecular weight of 570 or more to 630 or less.

12. The reaction liquid according to claim 11, further comprising a buffer,
wherein the content of the buffer (% by mass) is 0.10% by mass or more and 1.0% by mass or less, based on the total mass of the reaction liquid.

13. The reaction liquid according to claim 12, wherein the reaction liquid further comprises ions selected from the group consisting of $Cl^-$, $NO_3^-$, $I^-$, $Br^-$, $ClO^-$, $ClO_3^-$, $ClO_4^-$ and $CH_3COO^-$ as counter ions of the calcium ions.

14. The reaction liquid according to claim 13, wherein the counter ions of the calcium ions comprise $NO_3^-$ ions.

15. A set of an ink and a reaction liquid, the set comprising:
an ink comprising carbon black as a coloring material and acetylene glycol ethylene oxide adduct as a surfactant; and
a reaction liquid destabilizing one of a dissolved state and dispersed state of the coloring material in the ink by being in contact with the ink on a recording medium,
wherein the reaction liquid comprises (1) calcium ions, (2) glycerin, (3) polyethylene glycol having an average molecular weight of 200 or more and 1,000 or less, and (4) acetylene glycol ethylene oxide adduct as a surfactant,
wherein the content of the calcium ions, A (% by mass), is 2.7% by mass or more and 4.3% by mass or less, based on the total mass of the reaction liquid,
wherein the sum total of the content of the glycerin, B (% by mass), and the content of the polyethylene glycol, C (% by mass), based on the total mass of the reaction liquid is 6 times or more and 11 times or less the content of the calcium ions A (% by mass),
wherein the ratio of the content of the glycerin B (% by mass) to the sum total of the content of the glycerin B (% by mass) and the content of the polyethylene glycol C (% by mass), (B/(B+C)), is 0.3 or more and 0.7 or less,
wherein the content of the surfactant in the reaction liquid is more than that in the ink, and
wherein the content of the surfactant in the reaction liquid (% by mass) is 0.30% by mass or more and 0.80% by mass or less, based on the total mass of the reaction liquid.

16. The set of an ink and a reaction liquid according to claim 15, wherein the reaction liquid has a viscosity higher than that of the ink.

17. An ink jet recording apparatus comprising:
a recording head for ejecting an ink comprising a coloring material;
an ink cartridge having an ink storage portion for storing the ink; and
a unit for applying, to a recording medium, a reaction liquid destabilizing one of a dissolved state and dispersed state of the coloring material in the ink by being in contact with the ink on the recording medium, wherein the reaction liquid is the reaction liquid according to claim 1.

18. The ink jet recording apparatus according to claim 17, wherein the amount of the reaction liquid applied to the recording medium is 0.5 g/m$^2$ or more and 3 g/m$^2$ or less.

19. The ink jet recording apparatus according to claim 17, wherein the unit for applying the reaction liquid to the recording medium is a coating roller.

20. An image recording method comprising the steps of:

applying to a recording medium a reaction liquid destabilizing one of a dissolved state and dispersed state of a coloring material in an ink by being in contact with the ink comprising the coloring material on the recording medium, so as to include at least a region on the recording medium that can be in contact with the ink; and applying the ink to the recording medium by an ink jet system, wherein the reaction liquid is the reaction liquid according to claim 1.

21. The image recording method according to claim 20, wherein the amount of the reaction liquid applied to the recording medium is 0.5 g/m$^2$ or more and 3 g/m$^2$ or less.

22. The image recording method according to claim 20, wherein application of the reaction liquid to the recording medium is performed by a coating roller.

* * * * *